(12) United States Patent
Thang et al.

(10) Patent No.: US 11,343,296 B2
(45) Date of Patent: *May 24, 2022

(54) METHOD AND DEVICE FOR PROVIDING STREAMING CONTENT

(71) Applicant: HELIOS STREAMING, LLC, Lake Forest, CA (US)

(72) Inventors: Truong Cong Thang, Daejeon (KR); Jin Young Lee, Daejeon (KR); Seong Jun Bae, Daejeon (KR); Jung Won Kang, Daejeon (KR); Soon Heung Jung, Daejeon (KR); Sang Taick Park, Daejeon (KR); Won Ryu, Daejeon (KR)

(73) Assignee: HELIOS STREAMING, LLC, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,667

(22) Filed: Sep. 14, 2020

(65) Prior Publication Data

US 2021/0273984 A1 Sep. 2, 2021

Related U.S. Application Data

(63) Continuation of application No. 16/421,087, filed on May 23, 2019, now Pat. No. 10,812,553, which is a
(Continued)

(30) Foreign Application Priority Data

Sep. 1, 2010 (KR) .................. 10-2010-0085527
Sep. 1, 2011 (KR) .................. 10-2011-0088325

(51) Int. Cl.
*H04L 65/60* (2022.01)
*H04N 21/239* (2011.01)
(Continued)

(52) U.S. Cl.
CPC .......... *H04L 65/60* (2013.01); *H04L 65/4084* (2013.01); *H04L 67/2804* (2013.01);
(Continued)

(58) Field of Classification Search
CPC ............ H04L 65/4084; H04L 67/2804; H04N 21/23439; H04N 21/2393; H04N 21/25825; H04N 21/26258; H04N 21/8456
See application file for complete search history.

(56) References Cited

U.S. PATENT DOCUMENTS

2002/0147827 A1   10/2002   Breiter et al.
2005/0076136 A1   4/2005    Cho et al.
(Continued)

FOREIGN PATENT DOCUMENTS

KR   10-2005-0075633   7/2005
KR   10-2008-0108568   12/2008

OTHER PUBLICATIONS

"3rd Generation Partnership Project; Technical Specification Group Services and System Aspects Transparent end-to-end Packet-switched Streaming Service (PSS); Progressive Download and Dynamic Adaptive Streaming over HTTP (3GP-DASH", Release 10, Aug. 2010, Valbonne, France, pp. 1-34.
(Continued)

*Primary Examiner* — El Hadji M Sall
(74) *Attorney, Agent, or Firm* — One LLP (57) ABSTRACT

A method and apparatus for an adaptive Hypertext Transfer Protocol (HTTP) streaming service using metadata of content are provided. The metadata of the content may be efficiently divided for a purpose of use of a terminal based on general media information or specific media information, and may be transmitted to the terminal. A group may include one or more representations of content. The metadata may
(Continued)

include a group element, and the group element may provide a summary of attributes of one or more representations included in the group.

18 Claims, 7 Drawing Sheets

Related U.S. Application Data continuation of application No. 16/224,555, filed on Dec. 18, 2018, now Pat. No. 10,356,145, which is a continuation of application No. 15/785,275, filed on Oct. 16, 2017, now Pat. No. 10,178,142, which is a continuation of application No. 13/820,408, filed as application No. PCT/KR2011/006496 on Sep. 1, 2011, now Pat. No. 9,794,312.

(51) Int. Cl.

| | | |
|---|---|---|
| *H04N 21/845* | (2011.01) | |
| *H04N 21/2343* | (2011.01) | |
| *H04N 21/258* | (2011.01) | |
| *H04N 21/262* | (2011.01) | |
| *H04L 65/612* | (2022.01) | |
| *H04L 67/561* | (2022.01) | |
| *H04N 21/643* | (2011.01) | |
| *H04N 21/6437* | (2011.01) | |
| *H04N 21/658* | (2011.01) | |

(52) U.S. Cl.
CPC ... *H04N 21/2393* (2013.01); *H04N 21/23439* (2013.01); *H04N 21/25825* (2013.01); *H04N 21/26258* (2013.01); *H04N 21/8456* (2013.01); *H04N 21/6437* (2013.01); *H04N 21/64322* (2013.01); *H04N 21/6582* (2013.01)

(56) References Cited

U.S. PATENT DOCUMENTS

| | | |
|---|---|---|
| 2005/0102371 A1 | 5/2005 | Aksu |
| 2005/0160177 A1 | 7/2005 | Kim |
| 2008/0168132 A1 | 7/2008 | Chun |
| 2009/0207866 A1 | 8/2009 | Cholas et al. |
| 2009/0259766 A1 | 10/2009 | Karlsson et al. |
| 2009/0287841 A1 | 11/2009 | Chapweske et al. |
| 2010/0106770 A1 | 4/2010 | Taylor et al. |
| 2010/0169303 A1 | 7/2010 | Biderman et al. |
| 2010/0262711 A1* | 10/2010 | Bouazizi ............ H04L 65/00 709/231 |
| 2011/0093337 A1 | 4/2011 | Granit et al. |
| 2011/0099594 A1 | 4/2011 | Chen et al. |
| 2012/0013746 A1 | 1/2012 | Chen et al. |
| 2012/0042050 A1 | 2/2012 | Chen et al. |
| 2012/0290644 A1 | 11/2012 | Gabin et al. |
| 2014/0304602 A1 | 10/2014 | Lettau et al. |

OTHER PUBLICATIONS

Description of Evaluation Experiments on ISO/IEC 23001-6, Dynamic Adaptive Streaming over HTTP, ISO/IEC JTC1/SC29/WG11, Jul. 2010, Geneva, Switzerland, pp. 1-18.

Fielding, R., et al., "Hypertext Transfer Protocol—HTTP/1.1", RFC 2616, Jun. 1999, pp. 1-176.

Partial Representation Management, 3GPP TSG-SA4 Meeting #60, Aug. 2010, Erlangen, Germany, pp. 1-3.

Pyle, H., et al., "Microsoft HTTP Smooth Streaming: Microsoft response to the ISO/IEC/JTC1/SC29/WG11/N1338 Call for Proposal on HTTP Streaming", Jul. 2010, Geneva, Switzerland, pp. 1-31.

Stockhammer, T., "WD 0.1 of 23001-6 Dynamic Adaptive Streaming over HTTP (DASH)", ISO/IEC JTC1/SC29/WG11, Jul. 2010, Geneva, Switzerland, pp. 1-16.

Thang, T.C., et al., "Signaling Metadata for Adaptive HTTP Streaming", Jul. 2010, Geneva, Switzerland, pp. 1-30.

"Universal Mobile Telecommunications System (UMTS); LTE; Transparent end-to-end Packet-switched Streaming Service (PSS); Protocols and codecs", Release 9, Jun. 2010, Valbonne, France, pp. 1-184.

"Use cases for Rel-10 Adaptive HTTP Streaming", 3GPP TSG-SA4#60, Aug. 2010, Erlangen, Germany, pp. 1-5.

Zambelli, A., "IIS Smooth Streaming Technical Overview", Mar. 2009, pp. 1-18.

* cited by examiner

METHOD AND DEVICE FOR PROVIDING STREAMING CONTENT

CROSS-REFERENCES TO RELATED APPLICATIONS

The present application is a continuation of U.S. application Ser. No. 16/421,087, filed on May 23, 2019, which is a continuation of U.S. application Ser. No. 16/224,555, filed on Dec. 18, 2018, now U.S. Pat. No. 10,356,145, which is a continuation of U.S. application Ser. No. 15/785,275, filed on Oct. 16, 2017, now U.S. Pat. No. 10,178,142, which is a continuation of U.S. application Ser. No. 13/820,408, filed on Mar. 1, 2013, now U.S. Pat. No. 9,794,312, which is a national stage of PCT/KR2011/006496, filed on Sep. 1, 2011, which claims priority to Korean Application No. 10-2010-0085527, filed on Sep. 1, 2010, and Korean Application No. 10-2011-0088325, filed on Sep. 1, 2011, in the Korean Intellectual Property Office, all of which are incorporated herein by reference in their entireties for all purposes.

TECHNICAL FIELD

The present invention relates to a technology for providing streaming content, and more particularly, to an apparatus and method for providing media content using adaptive streaming.

BACKGROUND ART

Streaming is one of schemes for transmitting and playing back multimedia content such as sounds, moving images, and the like. A client may play back content while receiving the content through the streaming.

An adaptive streaming service refers to providing a streaming service employing a communication scheme with a request of a client and a response of a server in response to the request.

The client may request a media sequence suitable for an environment of the client (for example, a transmission channel of the client), using the adaptive streaming service. The server may provide a media sequence matched to the request of the client among media sequences with various qualities that are included in the server.

The adaptive streaming service may be provided based on various protocols.

A Hypertext Transfer Protocol (HTTP) adaptive streaming service refers to an adaptive streaming service provided based on an HTTP protocol. A client of the HTTP adaptive streaming service may receive content from a server using the HTTP protocol, and may transmit a request associated with a streaming service to the server.

DISCLOSURE OF INVENTION

Technical Goals

An aspect of the present invention provides an apparatus and method that may efficiently divide and transmit media information for a purpose of use of a terminal in an active Hypertext Transfer Protocol (HTTP) streaming, by using general media information and specific media information.

Another aspect of the present invention provides an apparatus and method that may use a group element that provides a summary of attributes of one or more representations included in a group in an active HTTP streaming.

Technical Solutions

According to an aspect of the present invention, there is provided a method for providing media, the method including: receiving metadata of media including one or more periods; accessing segments of the media based on information provided by the metadata; and decoding and rendering data of the media that is included in the segments, wherein each of the periods includes one or more groups, each of the groups includes one or more representations of the media, and each of the representations is a structured collection of one or more media components within a period, and includes one or more segments.

The metadata may be a Media Presentation Description (MPD) of the media.

The metadata may include a group element describing each of the groups.

The group element may provide a summary of values of attributes of all representations within a group described by the group element.

The metadata may include an attribute indicating a minimum value among bandwidth attributes of all representations within a group, and an attribute indicating a maximum value among the bandwidth attributes.

The metadata may include an attribute indicating a minimum value among horizontal resolution attributes of all representations within a group, and an attribute indicating a maximum value among the horizontal resolution attributes.

The metadata may include an attribute indicating a minimum value among frame rate attributes of all representations within a group, and an attribute indicating a maximum value among the frame rate attributes.

According to another aspect of the present invention, there is provided a terminal, including: an access engine to receive metadata of media including one or more periods, to receive segments of the media based on information provided by the metadata, and to output the media by decoding data of the media that is included in the segments; and a media engine to receive the data of the media from the access engine, and to output the media, wherein each of the periods includes one or more groups, each of the groups includes one or more representations of the media, and each of the representations is a structured collection of one or more media components within a period, and includes one or more segments.

According to still another aspect of the present invention, there is provided a method by which a terminal requests content through Hypertext Transfer Protocol (HTTP) streaming to receive the content through the HTTP streaming, the method including: transmitting, to a server, a transmission request message including attributes of the terminal; receiving, from the server, a specific Media Presentation Description (MPD) suitable for the terminal, the specific MPD including descriptions of representations of the content; selecting an appropriate representation from among the representations in the specific MPD, based on the descriptions of the representations; and requesting the server to transmit content corresponding to the selected representation.

The transmission request message may be an HTTP request message, the attributes may be transferred as parameters of the HTTP request message, and the HTTP request message may transfer parameters representing the attributes to the server using a query of an HTTP.

The attributes may be transferred as parameters of the HTTP request message, and the HTTP request message may include the parameters in an HTTP header and may transfer the parameters representing the attributes to the server.

The attributes may include a capability of the terminal and a preference of the terminal.

The attributes may include a minimum bandwidth, a maximum bandwidth, and an average bandwidth of a network resource that are acceptable by the terminal, may include a vertical resolution and a horizontal resolution of the terminal, and may include a frame rate of the terminal.

The specific MPD may include Uniform Resource Identifiers (URIs) of the descriptions.

The requesting may include requesting the server to transmit the content corresponding to the selected representation, using a URI of the selected representation.

According to yet another aspect of the present invention, there is provided a method for providing content through HTTP streaming, the method including: receiving, from a terminal, a transmission request message including attributes of the terminal; transmitting, to the terminal, a specific Media Presentation Description (MPD) suitable for the terminal based on the attributes, the specific MPD including descriptions of representations specific to a predetermined category of the terminal, and URIs of the specific representations; receiving, from the terminal, a request for content corresponding to a representation selected by the terminal, the content corresponding to the selected representation being requested via a URI of the selected representation in the specific MPD; and transmitting the content corresponding to the selected representation to the terminal through the HTTP streaming.

The method may further include analyzing the attributes and generating the specific MPD suitable for the terminal.

The specific MPD may be generated based on a general MPD, and the general MPD may include descriptions of all representations of the content, and URIs of all of the representations.

The method may further include analyzing the attributes and selecting the specific MPD suitable for the terminal from among specific MPDs that are generated in advance.

According to a further aspect of the present invention, there is provided a method by which a terminal requests content through HTTP streaming to receive the content through the HTTP streaming, the method including: transmitting a transmission request message to a server; receiving a general MPD from the server, the general MPD including parameters to describe each of one or more specific MPDs; selecting a specific MPD from among the one or more specific MPDs based on the parameters, the specific MPD including representations of the content; requesting the server to transmit the selected specific MPD; receiving the selected specific MPD from the server; requesting the server to transmit one or more content representations of the content adapted to the use of the terminal, using the selected specific MPD; and receiving, from the server, the one or more content representations.

The method may further include selecting an appropriate representation from among the one or more content representations, requesting the server to transmit content corresponding to the selected representation using the selected representation, and receiving, from the server, the content corresponding to the selected representation through the HTTP streaming.

The method may further include receiving an update of the specific MPD from the server.

The parameters may include a Uniform Resource Locator (URL) indicating a location of the specific MPD.

The requesting for the selected specific MPD may include requesting the server to transmit the selected specific MPD using a URL of the selected specific MPD.

The selecting of the specific MPD may include determining whether each of the one or more specific MPDs is suitable, based on the parameters.

The parameters may include a view identifier (ID) of multi-view video of the content, and may include a complexity and quality of audio/video of the content.

The requesting for the one or more content representations may include requesting the server to transmit the one or more content representations of the content adapted to the use of the terminal, using the selected specific MPD, after a predetermined period of time elapses.

According to a further aspect of the present invention, there is provided a method for providing content through HTTP streaming, the method including: receiving a transmission request message from a terminal; transmitting a general MPD to the terminal, the general MPD including parameters to describe each of one or more specific MPDs; receiving, from the terminal, a request for a specific MPD selected from among the one or more specific MPDs, the selected specific MPD including descriptions of representations specific to a predetermined category of terminals and URIs of the specific representations; transmitting the selected specific MPD to the terminal; receiving, from the terminal, a request for one or more content representations adapted to the use of the terminal among the specific representations; and transmitting the one or more content representations to the terminal.

The method may further include receiving, from the terminal, a request for content corresponding to a representation selected from among the one or more content representations, and transmitting, to the terminal, the content corresponding to the selected representation through the HTTP streaming.

Effect of the Invention

According to embodiments of the present invention, it is possible to efficiently divide and transmit media information for a purpose of use of a terminal in an active Hypertext Transfer Protocol (HTTP) streaming, by using general media information and specific media information.

Additionally, according to embodiments of the present invention, it is possible to use a group element that provides a summary of attributes of one or more representations included in a group in an active HTTP streaming.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

A Dynamic Adaptive Streaming over HTTP (DASH) may specify formats that enable 1) delivery of media content from an HTTP server to an HTTP client, and enable 2) caching of content by standard HTTP cashes.

A media component may be an encoded version of individual media types, such as audios, videos, or timed texts with specific attributes, for example bandwidths, languages, or resolutions.

Media content may be a set of media components having a common timeline, for example audios, videos, or timed texts. Additionally, media components may have relationships on how the media components may be presented (for example, individually, jointly, or mutually exclusive) as programs or movies.

Media content and content may be used as interchangeable terms.

A media presentation may be a structured collection of data used to establish bounded or unbounded presentation of media content including components of continuous media.

In other words, the media presentation may be a structured collection of data that is accessible to a DASH client in order to provide a streaming service to a user.

A Media Presentation Description (MPD) may be a formalized description for a media presentation. The MPD may be an MPD of a "Dynamic Adaptive HTTP Streaming of MPEG (DASH)."

The media presentation may be described by an MPD including possible updates of the MPD.

Content may be content on demand, or live content.

The content may be divided into one or more intervals. In other words, the content may include one or more intervals. Intervals may be interchangeable with periods. The term period may be used as a term of $3^{rd}$ Generation Partnership Project (3GPP) adaptive HTTP streaming.

A period may be an interval of a media presentation. A sequence of all periods may constitute the media presentation.

In other words, the media presentation may include one or more periods.

One or more intervals may be a basic unit. One or more intervals may be described by signaling metadata. In other words, metadata may describe each of the one or more intervals.

The metadata may be an MPD.

The MPD may include description of a representation (or an expression) of all possible media to be transmitted to all types of clients. In other words, the MPD may include description of combinations of video, audio, languages, and the like that may be used by all types of clients. To provide an adaptive streaming service employing an HTTP, a server needs to transmit an MPD of a media presentation to a terminal 110. To transmit the MPD, a server 100 needs to write the MPD of the media presentation, and the server and the terminal need to perform negotiation for transmission of the MPD.

The MPD may define a format to announce resource identifiers for segments. The MPD may provide a context for identified resources within the media presentation. The resource identifiers may be HTTP-Uniform Resource Locators (URLs). URLs may be restricted by a byte range attribute.

Each interval may be divided into fragments.

Fragments may be interchangeable with segments. The term segment may be used as a term of 3GPP adaptive HTTP streaming.

A segment may refer to an entity body of a response to an HTTP/1.1 GET request for an HTTP-URL, for example as defined in RFC 2616, (or a partial GET request for a part indicated by a byte range).

A sub-segment may refer to a smallest unit within segments that may be indexed by a segment index at the segment level.

Two or more sets of fragments corresponding to a single interval may exist. Each of the sets may be called an alternative.

An alternative may be interchangeable with a representation.

Each period may include one or more groups.

Each group may include one or more representations of the same media content.

A representation may refer to a structured collection of one or more media components within a single period. A representation may be one of alternative choices of the media content or a subset of the media content typically differing by the encoding choice, for example by a bitrate, a resolution, a language, a codec, and the like. In other words, the representation may represent a combination of video, audio, languages, and the like that may constitute media.

An MPD (or an MPD element) may provide descriptive information that enables a client to select one or more representations.

Each representation may be formed of one or more segments. In other words, a representation may include one or more segments.

An MPD may be a document including metadata required to a DASH client to form appropriate HTTP-URLs in order to 1) access segments and to 2) provide a user with a streaming service. The HTTP-URLs may be absolute or relative.

The MPD may be an Extensible Markup Language (XML)-document.

The MPD may include an MPD element. The MPD may include only a single MPD element.

Figure 1:
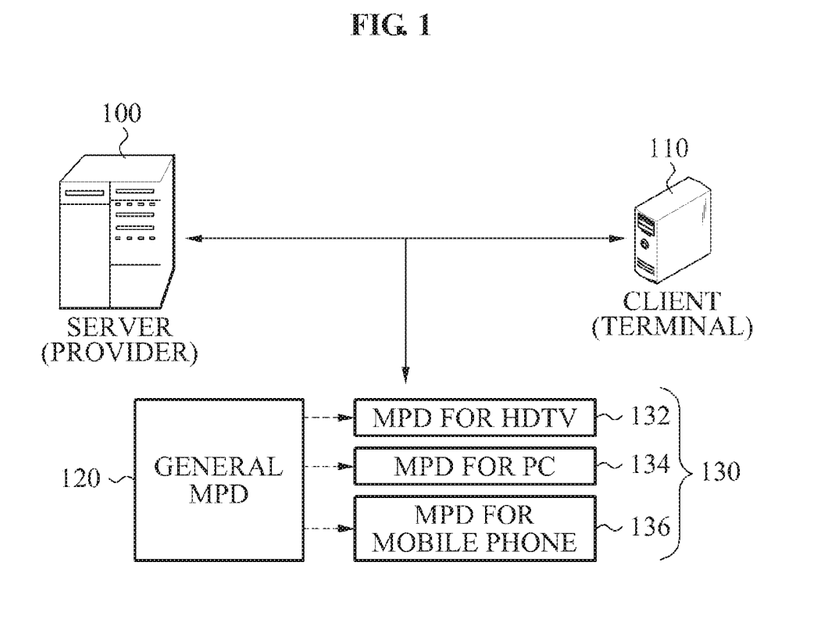
FIG. 1 is a diagram illustrating different types of Media Presentation Description (MPD) according to an embodiment of the present invention.

FIG. 1 illustrates different types of MPD according to an embodiment of the present invention.

The server 100 may transfer an MPD as a single large file to the terminal 110.

Generally, only a few representations among MPDs provided by the server 100 may be suitable for the terminal 110.

Accordingly, for transmission of a file in the entire session, a network resource (for example, a bandwidth, and the like) may be wasted. Additionally, the terminal 110 may waste processing power to search for an available media representation (for example, a client needs to at least parse the entire description file). Therefore, there is a need for a method that may efficiently transmit a list file to minimize resource waste.

The server 100 (namely, a provider) may generate (in advance, or on the fly) different MPDs for different categories of the terminal 110 (namely, a client).

The first type of MPD may be a "general MPD 120." The general MPD 120 may be called a first MPD.

The general MPD 120 may include description of all representations of content, and Uniform Resource Identifiers (URIs) of all of the representations.

Additionally, the provider 100 may include "specific MPD(s) 130" as the second type. The specific MPD 130 may include only descriptions of representations specific to a certain category of the terminal 110, and URIs of the specific representations.

For example, the provider 100 may have three specific MPDs 132, 134, and 136 for three categories of the terminal 110 (namely, a High-Definition TeleVision (HDTV), a Personal Computer (PC), and a mobile phone). The specific MPD 132, 134, or 136 may be called a second MPD.

Clearly, no mobile phone may take into consideration representations used for an HDTV.

Actually, the provider 100 may have a specific description that provides hints so that the terminal 110 may select appropriate representations from an MPD (in particular, the general MPD 120).

In particular, the description may provide a list of compositions. Each of the compositions may indicate representations (or groups of a representation) that may be used for a given purpose (for example, for a French-speaking user using a mobile phone).

Figure 2:
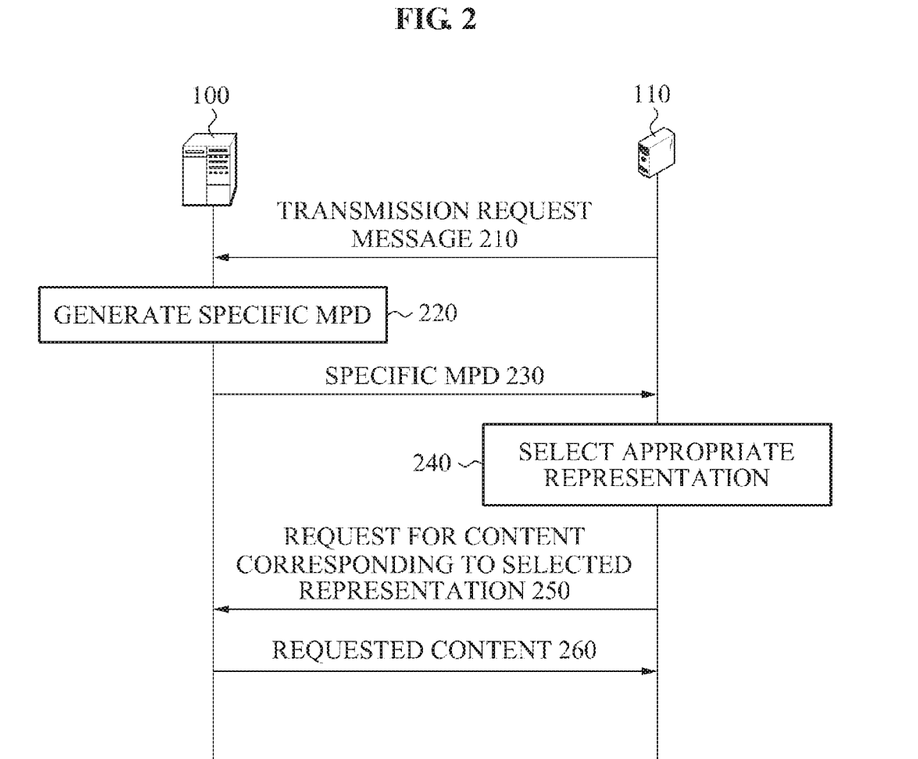
FIG. 2 is a flowchart illustrating a server-driven content transmission negotiation method according to an embodiment of the present invention.

FIG. 2 is a flowchart illustrating a server-driven content transmission negotiation method according to an embodiment of the present invention.

The server-driven content transmission negotiation method may be based on a general server-driven transmission negotiation scheme according to an HTTP/1.1 technology.

In operation 210, the terminal 110 may transmit, to the server 100, a transmission request message including several specific attributes (for example, capabilities and preferences of the terminal 110).

The transmission request message may be an HTTP request message. Additionally, the specific attributes may be transferred as parameters of the HTTP request message.

The HTTP request message may transfer parameters representing the specific attributes to the server 100, using a query of an HTTP.

The HTTP request message may include parameters in an HTTP header, and may transfer parameters representing the specific attributes to the server 100.

The specific attributes (namely, parameters) included in the transmission request message may enable the server 100 to verify capabilities and preferences of the terminal 110.

Table 1 shows examples of specific attributes (namely, parameters).

TABLE 1

| Name | Description |
|---|---|
| capability | Information associated with a capability of a terminal |
| preference | Information associated with a preference of a terminal or a user of a terminal |
| minBand | Minimum bandwidth of a network resource acceptable by a terminal (namely, minimum bandwidth of network connection of a terminal) (in Mbps) |
| maxBand | Maximum bandwidth of a network resource acceptable by a terminal (in Mbps) |

TABLE 1-continued

| Name | Description |
|---|---|
| averBand | Average bandwidth of a network resource acceptable by a terminal (in Mbps) |
| width | Horizontal resolution of a terminal screen (in pixels) |
| height | Vertical resolution of a terminal screen (in pixels) |
| framerate | Maximum video frame rate supported by a terminal |
| lang | Language code of media content supported by a terminal (language code may conform to RFC 5646) |
| mime | Multipurpose Internet Mail Extensions (MIME) type supported by a terminal. The MIME type may include codec parameters for all media types. Codec parameters may include profile and level information. |

Parameters other than the parameters of Table 1 may be added, to support features of content (for example, a view identifier (ID) of a multi-view video, a complexity and quality of audio/video, and the like).

Based on the specific attributes, the server 100 may transmit, to the terminal, the specific MPD 130 suitable for the terminal 110.

In operation 220, the server 100 may generate the specific MPD 130 suitable for the terminal 110 by analyzing the specific attributes of the terminal 110. The server 100 may generate the specific MPD 130 based on the general MPD 120.

Alternatively, the server 100 may analyze the specific attributes of the terminal 110, and may select a specific MPD 130 suitable for the terminal 110 from among specific MPDs 130 that are generated in advance.

In operation 230, the server 100 may transmit, to the terminal 110, the specific MPD 130 that is generated or selected.

In operation 240, the terminal 110 may select an appropriate representation from among representations of content within the specific MPD 130. In other words, the terminal 110 may select a content version based on descriptions of representations.

In operation 250, the terminal 110 may send, to the server 100, a request for content corresponding to the selected representation, using a URI of the selected representation (namely, a URI associated with the selected representation).

In operation 260, the server 100 may transmit, to the terminal 110, the content corresponding to the selected representation through HTTP streaming.

Figure 3:
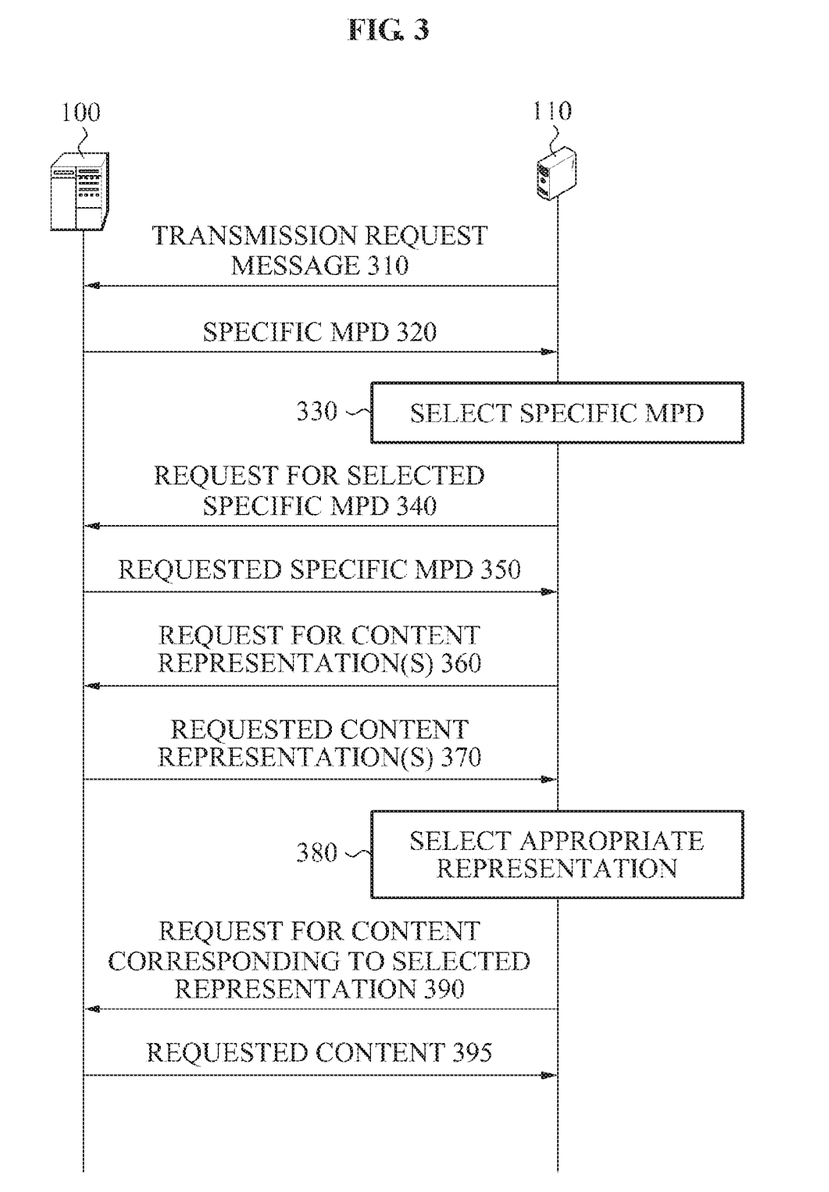
FIG. 3 is a flowchart illustrating a terminal-driven content transmission negotiation method according to an embodiment of the present invention.

FIG. 3 is a flowchart illustrating a terminal-driven content transmission negotiation method according to an embodiment of the present invention.

The terminal-driven content transmission negotiation method may be based on a general terminal-driven transmission negotiation scheme according to the HTTP/1.1 technology.

In operation 310, the terminal 110 may transmit, to the server 100, a basic transmission request message.

In operation 320, the server 100 may transmit the general MPD 120 to the terminal 110.

The terminal 110 may retrieve the general MPD 120, and may use the general MPD 120 to immediately receive appropriate content lists.

The general MPD 120 may be a parameter to describe each of the specific MPDs 130.

Parameters used to describe the specific MPD 130 may be represented in an XML format. The parameters may be represented by a "SpecificMPD element." The SpecificMPD element may be of a "SpecificMPDType" type.

Table 2 shows an example of the SpecificMPD element.

TABLE 2

| Name | Description |
| --- | --- |
| URL | Indicates location of specific MPD 120. Each specific MPD 120 may be associated with the URL indicating the location of the specific MPD 120. If specific MPD 120 is not generated in advance, a URL parameter may be absent. |
| parameters about component representations | Parameters about component representations correspond to a group of parameters. The group of parameters may have a plurality of instances. In other words, the group of parameters may appear several times in the general MPD 120. Each of the plurality of instances corresponds to a group of MPD. The group of parameters may be represented in the XML by a "ComponentRepresentations" element, as shown in Table 3 below. |

The following Table 3 shows attributes of a group element as an example of parameters about component representations.

The MPD may include a group element describing a group. The group element may provide a summary of values of attributes of all representations within a group described by the group element. The above-described parameters may include attributes of a group element described in Table 3.

TABLE 3

| Parameter Name (or Attribute) | Occurrence | Description | XML representation |
| --- | --- | --- | --- |
| group | 1 | Indicates an ID of a group. | unsignedInt |
| repIDs | 0 ... 1 | Indicates a list of representation IDs. | string including a list of representation IDs that are separated by white spaces |
| minBandwidth | 0 ... 1 | Indicates a minimum value among bandwidth attributes of all representations in a group. | unsignedInt |
| maxBandwidth | 0 ... 1 | Indicates a maximum value among bandwidth attributes of all representations in a group. | unsignedInt |
| minWidth | 0 ... 1 | Indicates a minimum value among horizontal resolution attributes of all representations in a group. The horizontal resolution may be counted in pixels. | unsignedInt |
| maxWidth | 0 ... 1 | Indicates a maximum value among horizontal resolution attributes of all representations in a group. | unsignedInt |
| minHeight | 0 ... 1 | Indicates a minimum value among minimum height attributes of all representations in a group. The vertical resolution may be counted in pixels. | unsignedInt |
| maxHeight | 0 ... 1 | Indicates a maximum value among maximum height attributes of all representations in a group. | unsignedInt |
| minFrameRate | 0 ... 1 | Indicates a minimum value among frame rate attributes of all representations in a group. | unsignedInt |
| maxFrameRate | 0 ... 1 | Indicates a maximum value among frame rate attributes of all representations in a group. | unsignedInt |
| lang | 0 ... 1 | Declares language code(s) of a corresponding representation. Language code may conform to Request for Comments (RFC) 5646. | string |
| mimeType | 0 ... 1 | Gives MIME type of a group. The MIME type may include codec parameters for all media types. Codec parameters may include profile and level information. | string |

A group (or a representation group) may correspond to the specific MPD 130. In other words, "representations in a group (or one or more representations included in a group)" may refer to "representations included in the specific MPD 130."

When the specific MPD 130 includes one or more periods, a minimum parameter (or a maximum parameter) may be a minimum value (or a maximum value) across the periods.

The parameters of Table 3 may be extended to support other features of content (for example, a view ID of a multi-view video, a complexity and quality of audio/video, and the like). In the XML format, syntax elements "xs:anyAttribute" and "xs:any" may be used to support the scalability.

The SpecificMPD element may be used in different places (or different parts).

For example, the SpecificMPD element may be used in the general MPD 120. In this example, a SpecificMPDs element may include a plurality of instances of the SpecificMPD element.

Additionally, the SpecificMPDs element may be added as a direct child element of the general MPD 120.

Each of the instances of the SpecificMPD element may be used to reference the specific MPD 130.

Additionally, each of the instances of the SpecificMPD element may be used to select an appropriate representation from the general MPD 120. For example, when repID exists in an instance, the terminal 110 may go directly to representations described by the instance of the SpecificMPD element.

The server 100 may transmit, to the terminal 110, the general MPD 120 including only the SpecificMPDs element. Here, the terminal 110 may need to first receive the specific MPD 130 to obtain information regarding specific representations.

The SpecificMPD element may be used in other places (or parts). The SpecificMPD element may be used in a separate description of typical combinations of representations (for example, composition description). Here, each composition may be associated with the specific MPD 130 (for example, the SpecificMPD element is used as a child element of a combination element).

In operation 330, the terminal 110 may select the specific MPD 130.

The terminal 110 may decide whether the related specific MPD 130 is suitable for the terminal 110, based on the parameters about component representations, and may select the specific MPD 130 based on the decision.

In operation 340, the terminal 110 may send, to the server 100, a request for the selected specific MPD 130.

The terminal 110 may request the server 100 to transit the selected specific MPD 130, using a URL of the selected specific MPD 130.

In operation 350, the server 100 may transmit the selected specific MPD 130 to the terminal 110.

The terminal 110 may receive the selected specific MPD 130 from the server 100.

In operation 360, after a predetermined period of time (for example, a duration or first period of the general MPD 120) elapses, the terminal 110 may send, to the server 100, a request for content representation(s) adapted to use of the terminal, by using the specific MPD 130.

In operation 370, the server 100 may transmit, to the terminal 110, the requested content representation(s).

The terminal 110 may receive the content representation(s) from the server 100.

Later on, the terminal 110 may receive, from the server 100, an update of only the specific MPD 130, not the general MPD 120. Periods where the update is performed may be called second periods or backend periods.

In operation 380, the terminal 110 may select an appropriate representation from among the requested content representation(s).

In operation 390, the terminal 110 may send, to the server 100, a request for content corresponding to the selected representation, using a URL of the selected representation.

In operation 395, the server 100 may transmit, to the terminal 110, the content corresponding to the selected representation through HTTP streaming.

The following Table 4 shows an example of a location of the 'SpecificMPD' element, 'ComponentRepresentationsType' complexType, 'MPDtype' complexType, and the SpecificMPDs element in the general MPD 120.

TABLE 4

```
<?xml version="1.0" encoding="UTF-8"?>
<xs:schema
targetNamespace="urn:3GPP:ns:PSS:AdaptiveHTTPStreamingMPD:2009"
    attributeFormDefault="unqualified
    elementFormDefault="qualified"
    xmlns:xs="http://www.w3.org/2001/XMLSchema"
    xmlns="urn:3GPP:ns:PSS:AdaptiveHTTPStreamingMPD:2009">
    <xs:annotation>
        <xs:appinfo>Media Presentation Description</xs:appinfo>
        <xs:documentation xml:lang="en">
            This Schema defines 3GPP Media Presentation Description!
        </xs:documentation>
    </xs:annotation> <!-- MPD: main element -->
    <xs:element name="MPD" type="MPDtype"/>
    <xs:element name="SpecificMPD" type="SpecificMPDType"/>
    ...
</xs:complexType>
<xs:complexType name="ComponentRepresentationsType">
...
</xs:complexType>
<!--MPD Type-->
<xs:complexType name="MPDtype">
...
</xs:complexType>
<xs:complexType name="SpecificMPDsType">
```

TABLE 4-continued

```
   ...
   </xs:complexType>
...
...
</xs:schema>
```

Table 5 shows syntax of the SpecificMPD element.

TABLE 5

```
<xs:element name="SpecificMPD" type="SpecificMPDType"/>
<!-- Information about specific MPD -->
<xs:complexType name="SpecificMPDType">
   <xs:sequence>
      <xs:element minOccurs="0" name="MPDURL" type="xs:anyURI"/>
      <xs:element minOccurs="0" maxOccurs="unbounded"
name="ComponentRepresentations" type="xs:ComponentRepresentationsType"/>
      <xs:any namespace="##other" processContents="lax" minOccurs="0"
maxOccurs="unbounded"/>
   </xs:sequence>
   <xs:anyAttribute namespace="##other" processContents="lax"/>
</xs:complexType>
```

Table 6 shows syntax of ComponentRepresentationsType complexType.

TABLE 6

```
<xs:complexType name="ComponentRepresentationsType">
   <xs:sequence>
      <xs:any namespace="##other" processContents="lax" minOccurs="0"
maxOccurs="unbounded"/>
   </xs:sequence>
   <xs:attribute name="group" type="xs:unsignedInt"/>
   <xs:attribute name="repIDs" type="xs:string"/>
   <xs:attribute name="minBandwidth" type="xs:unsignedInt" use="required"/>
   <xs:attribute name="maxBandwidth" type="xs:unsignedInt" use="required"/>
   <xs:attribute name="minWidth" type="xs:unsignedInt"/>
   <xs:attribute name="maxWidth" type="xs:unsignedInt"/>
   <xs:attribute name="minHeight" type="xs:unsignedInt"/>
   <xs:attribute name="maxHeight" type="xs:unsignedInt"/>
   <xs:attribute name="minFramerate" type="xs:unsignedInt"/>
   <xs:attribute name="maxFramerate" type="xs:unsignedInt"/>
   <xs:attribute name="lang" type="xs:string"/>
   <xs:attribute name="mimeType" type="xs:string" use="required"/>
   <xs:anyAttribute namespace="##other" processContents="lax"/>
</xs:complexType>
```

Table 7 shows syntax of MPDtype complexType.

TABLE 7

```
<xs:complexType name="MPDtype">
   <xs:sequence>
      <xs:element minOccurs="0" name="ProgramInformation"
type="ProgramInformationType"/>
      <xs:element minOccurs="0" name="SpecificMPDs"
type="SpecificMPDsType"/>
      <xs:element maxOccurs="unbounded" name="Period" type="PeriodType"/>
      <xs:any namespace="##other" processContents="lax" minOccurs="0"
maxOccurs="unbounded"/>
   </xs:sequence>
   <xs:attribute default="OnDemand" name="type" type="PresentationType"/>
   <xs:attribute name="availabilityStartTime" type="xs:dateTime"/>
   <xs:attribute name="availabilityEndTime" type="xs:dateTime"/>
   <xs:attribute name="mediaPresentationDuration" type="xs:duration"/>
   <xs:attribute name="minimumUpdatePeriodMPD" type="xs:duration"/>
   <xs:attribute name="minBufferTime" type="xs:duration" use="required"/>
   <xs:attribute name="timeShiftBufferDepth" type="xs:duration"/>
   <xs:attribute name="baseUrl" type="xs:anyURI"/>
   <xs:anyAttribute namespace="##other" processContents="lax"/>
</xs:complexType>
```

Table 8 shows syntax of the SpecificMPDs element.

TABLE 8

```
<xs:complexType name="SpecificMPDsType">
  <xs:sequence>
    <xs:element maxOccurs="unbounded" name="SpecificMPD"
type="xs:SpecificMPDType"/>
    <xs:any namespace="##other" processContents="lax" minOccurs="0"
maxOccurs="unbounded"/>
  </xs:sequence>
  <xs:anyAttribute namespace="##other" processContents="lax"/>
</xs:complexType>
```

Figure 4:
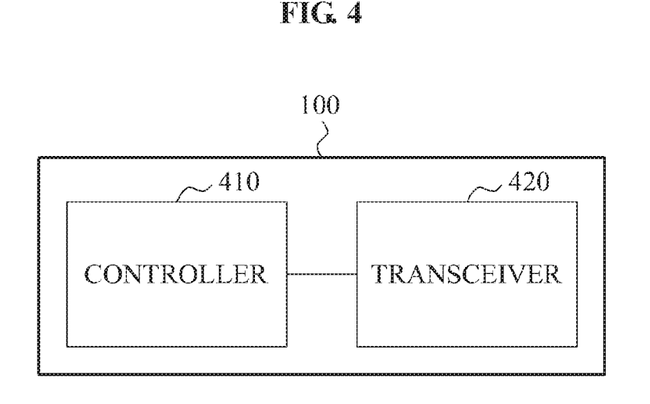
FIG. 4 is a diagram illustrating a configuration of a server 100 according to an embodiment of the present invention.

FIG. 4 is a diagram illustrating a configuration of the server 100 according to an embodiment of the present invention.

The server 100 may include a controller 410, and a transceiver 420.

The controller 410 may perform processing in response to a request from the terminal 110, and may generate an individual that is to be transmitted to the terminal 110.

The controller 410 may generate the general MPD 120, the specific MPD 130, a representation of content, and the like.

The transceiver 420 may receive, from the terminal 110, a request message, a request for a specific MPD, a request for content representations, a request for content, and the like, and may transmit, to the terminal 110, the general MPD 120, the specific MPD 130, a representation of content, and content corresponding to a selected representation.

Technical information according to the embodiments of the present invention described above with reference to FIGS. 1 through 3 may equally be applied to the present embodiment. Accordingly, further description thereof will be omitted.

Figure 5:
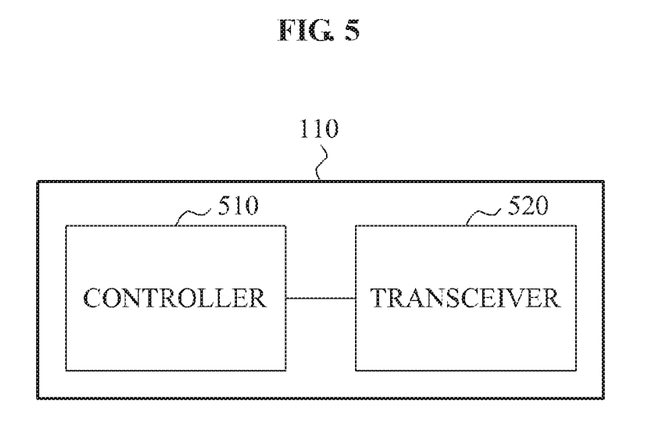
FIG. 5 is a diagram illustrating a configuration of a terminal 110 according to an embodiment of the present invention.

FIG. 5 is a diagram illustrating a configuration of the terminal 110 according to an embodiment of the present invention.

The server 100 may include a controller 510, and a transceiver 520.

The controller 510 may perform processing in response to a request from the server 100, and may generate an individual that is to be transmitted to the server 100.

The controller 510 may generate a transmission request message, and may perform processing, analyzing, and selecting of the general MPD 120, the specific MPD 130, a representation of content, and the like that are received from the server 100.

The transceiver 520 may transmit, to the server 100, a request message, a request for a specific MPD, a request for content representations, a request for content, and the like, and may receive, from the server 100, the general MPD 120, the specific MPD 130, a representation of content, and content corresponding to a selected representation.

Technical information according to the embodiments of the present invention described above with reference to FIGS. 1 through 4 may equally be applied to the present embodiment. Accordingly, further description thereof will be omitted.

Figure 6:
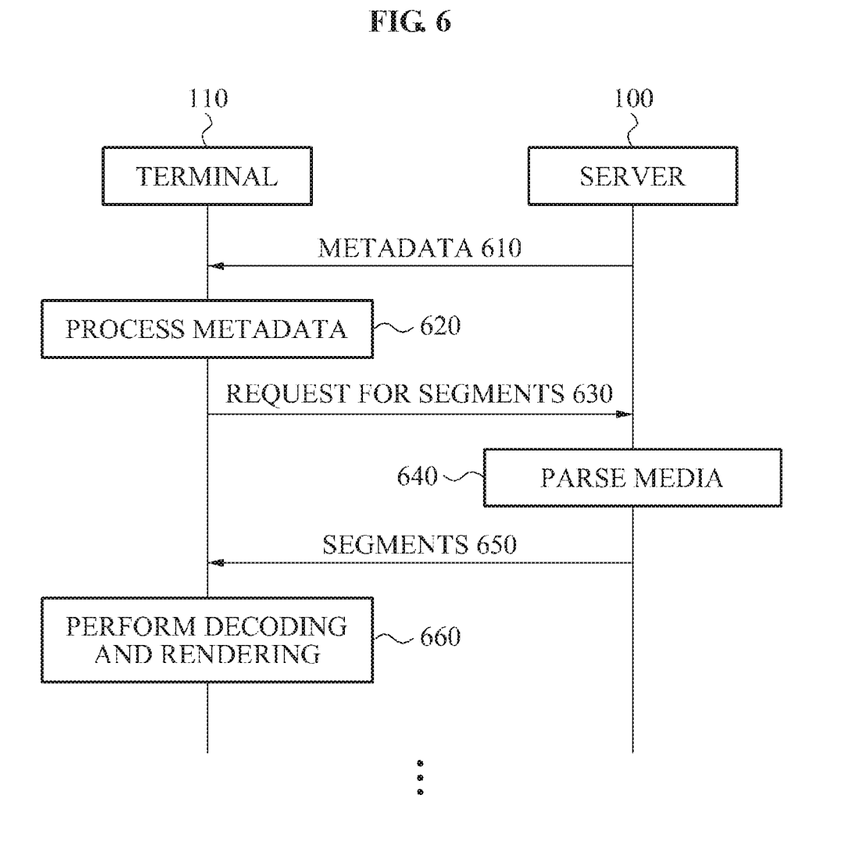
FIG. 6 is a signal flowchart illustrating a method for providing media according to an embodiment of the present invention.

FIG. 6 is a signal flowchart illustrating a method for providing media according to an embodiment of the present invention.

In operation 610, the terminal 110 may receive, from the server 100, 1) metadata of media (or content), or 2) metadata of a specific period (or a specific interval) of the media. In other words, the server 100 may transmit, to the terminal 110, 1) the metadata of the media, or the metadata of the specific period of the media. The media may include one or more periods, and the specific period may indicate a currently processed period among the one or more periods of the media.

The metadata may be media information.

In operation 620, the terminal 110 may process the metadata of the specific period. In operation 620, the terminal 110 may extract information provided by the metadata.

In operations 630 through 650, the terminal 110 may access segments of the media, based on the information provided by the metadata. Here, each of the periods may include one or more groups, and each of the groups may include one or more representations of the media. Each of the representations may include one or more segments.

The metadata may describe a group element describing a group.

In operation 630, the terminal 110 may send, to the server 100, a request for segments. The terminal 110 may request the server 100 to transmit segments suitable for the specific period based on the processed metadata. In other words, the requested segments may be selected based on the metadata.

In operation 640, in several cases, the server may need to parse media (for example, an MPEG layer 4 (MP4) file for Scalable Video Coding (SVC)), and to extract a data part suitable for the requested segments.

In operation 650, the server 100 may transmit, to the terminal 110, segments suitable for each request from the terminal 110. The terminal 110 may receive the segments from the server.

In operation 660, the terminal 110 may perform decoding and rendering on data of the media included in the segments, to play back the media.

The terminal 110 may play back the media using the received segments by repeating operations 610 through 660.

Technical information according to the embodiments of the present invention described above with reference to FIGS. 1 through 5 may equally be applied to the present embodiment. Accordingly, further description thereof will be omitted.

Figure 7:
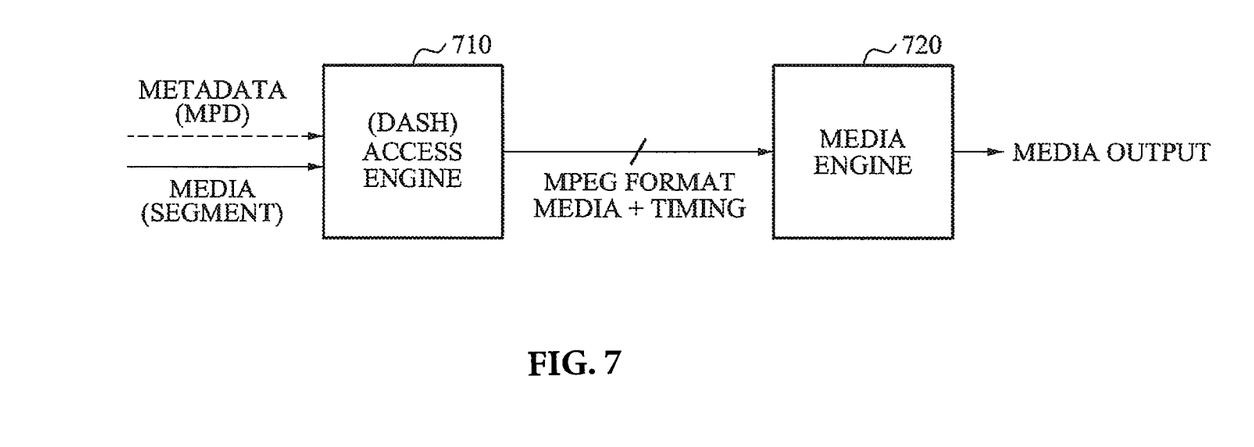
FIG. 7 is a diagram illustrating a configuration of the terminal 110 according to an embodiment of the present invention.

FIG. 7 is a diagram illustrating a configuration of the terminal 110 according to an embodiment of the present invention.

The terminal 110 may include an access engine 710, and a media engine 720.

The access engine 710 may be a DASH access engine.

The access engine 710 may receive metadata (for example, an MPD) from the server 100.

The access engine 710 may form requests, and may issue the formed requests to the server 100. The access engine 710 may receive media (for example, segments or parts of the segments) from the server 100.

The access engine 710 may receive segments of the media based on information provided by the metadata. Here, each period may include one or more groups, and each of the groups may include one or more representations of the media. Each of the representations may include one or more segments.

The access engine 710 may provide the media to the media engine 720. The access engine 710 may decode data of the media that is included in the segments.

An output of the access engine 710 may include media (or parts of the media) of an MPEG container (for example, an ISO/IEC 14492-12 ISO base media file format, or an ISO/IEC 13818-2 MPEG-2 TS). Additionally, the output of the access engine 710 may include timing information used to map internal timing of the media to a timeline of a media presentation.

The media engine 720 may play back the provided media. Specifically, the media engine 720 may receive data of the media from the access engine, and may output the media. The media engine 720 may output the media using the data of the media and the timing information that are output from the access engine 710.

Technical information according to the embodiments of the present invention described above with reference to FIGS. 1 through 6 may equally be applied to the present embodiment. Accordingly, further description thereof will be omitted.

The method according to the above-described embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of providing content performed by a server or multiple servers, the method comprising:
   transmitting, to a client, at least two metadata providing information that enables the client to select at least one or more media components of the content;
   receiving, from the client, a request for the content corresponding to a media component among the one or more media components in specific metadata, wherein the specific metadata is selected by the client among the at least two metadata and the specific metadata is suitable for the client; and
   transmitting the content corresponding to the media component to the client.

2. The method of claim 1, wherein the specific metadata is selected based on a specific attribute information about the client.

3. The method of claim 2, wherein the specific attribute information includes at least one of capability of the client and preference of a user of the client.

4. The method of claim 1, wherein the specific metadata is specific to a predetermined category of a terminal.

5. The method of claim 1, wherein the specific metadata includes one or more periods,
   wherein the period includes one or more groups,
   wherein the group includes one or more representations,
   wherein the representation includes one or more segments
   wherein the group includes one or more group elements for each of the groups,
   wherein the group element provides a summary of values of attributes of all representations within the group.

6. The method of claim 5, wherein the specific metadata comprises descriptions of representations of the content suitable for the client.

7. A method of providing content performed by a server or multiple servers, the method comprising:
   transmitting a general metadata, to the client, describing multiple specific metadata;
   receiving a request, from the client, for specific metadata suitable for the client, the specific metadata is selected among the multiple specific metadata by the client;
   transmitting the specific metadata to the client;
   receiving, from the client, a request for a media component of the content based on the specific metadata; and
   transmitting the media component to the client.

8. The method of claim 7, the specific metadata is selected based on a specific attribute about the client.

9. The method of claim 8, wherein the specific attribute includes at least one of capability of the client and preference of a user.

10. The method of claim 9, the specific attribute includes at least one of (i) capability, (ii) preference, (iii) minBand, (iv) maxBand, (v) averBand, (vi) width, (vii) height, (viii) framerate, (ix) lang, (x) mime, (xi) a view identifier (ID) of a multi-view video, (xii) a complexity or quality of audio and (xiii) a complexity or quality of video.

11. The method of claim 7, further comprising:
    receiving a transmission request message from the client, the transmission request message includes the specific attribute.

12. The method of claim 7, the specific metadata includes Uniform Resource Identifiers (URI) of the content.

13. The method of claim 7, the general metadata includes Uniform Resource Identifiers (URI) of the specific metadata.

14. The method of claim 7, the general metadata includes alternatives of the media content.

15. The method of claim 14, the alternatives are a set of the media content differing by a bitrate, a resolution, a language or a codec.

16. The method of claim 14, the alternatives are used for a given purpose of a specific language.

17. The method of claim 7, the general metadata includes a summary of values of media components.

18. The method of claim 7, the general metadata and the specific metadata are generated in advance.

* * * * *